United States Patent [19]
Rottler

[11] Patent Number: 5,255,901
[45] Date of Patent: Oct. 26, 1993

[54] FIXTURE SYSTEM FOR MOUNTING WORK PIECES TO BE MACHINED

[76] Inventor: Donald B. Rottler, 2617 W. Galer St., Seattle, Wash. 98199

[21] Appl. No.: 673

[22] Filed: Jan. 5, 1993

[51] Int. Cl.$^5$ .............................................. B25B 1/24
[52] U.S. Cl. ..................................... 269/99; 269/305; 269/309; 269/900
[58] Field of Search ............... 269/900, 305, 309, 310, 269/99-100, 296-301, 246

[56] References Cited

U.S. PATENT DOCUMENTS

| | | | |
|---|---|---|---|
| 1,954,708 | 4/1934 | Mass | 269/900 |
| 3,537,701 | 11/1970 | Claycomb | 269/309 |
| 4,196,897 | 4/1980 | Gordon | 269/99 |
| 4,586,702 | 5/1986 | Chambers | 269/310 |
| 4,901,990 | 2/1990 | Frechette | 269/900 |

Primary Examiner—Robert C. Watson
Attorney, Agent, or Firm—Seed and Berry

[57] ABSTRACT

A fixturing system for mounting engine blocks on a dual-axis table with T-ways in preparation for machining has two rear support units, a front support unit, and a front screw jack unit, on which the engine block is mounted. These units are adjustably clamped to the table by T-nuts. The two rear support units provide an adjustable vertical stem having an enlarged tapered head for engaging a rear portion of the engine block. The front of the engine block is engaged by the head of a clamping screw mounted on an adjustable bracket clamped against a slide block in turn clamped to the table.

9 Claims, 3 Drawing Sheets

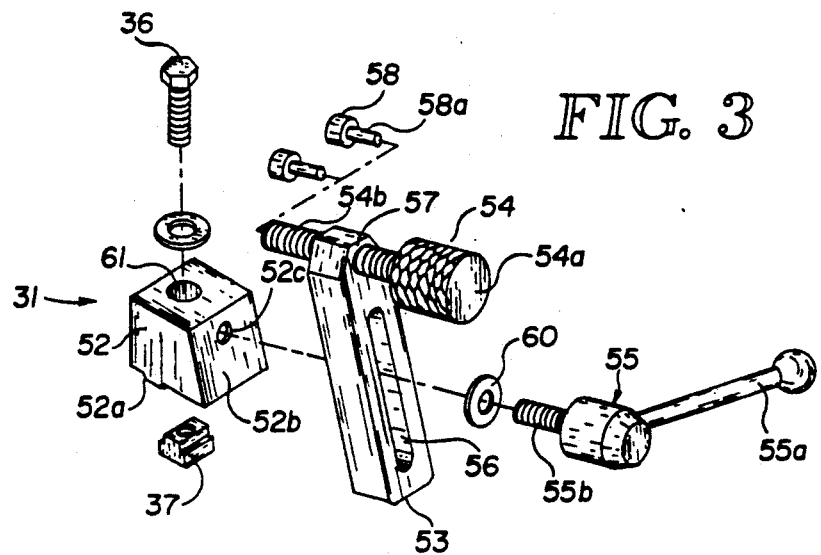
FIG. 3
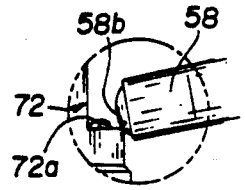
FIG. 2-A
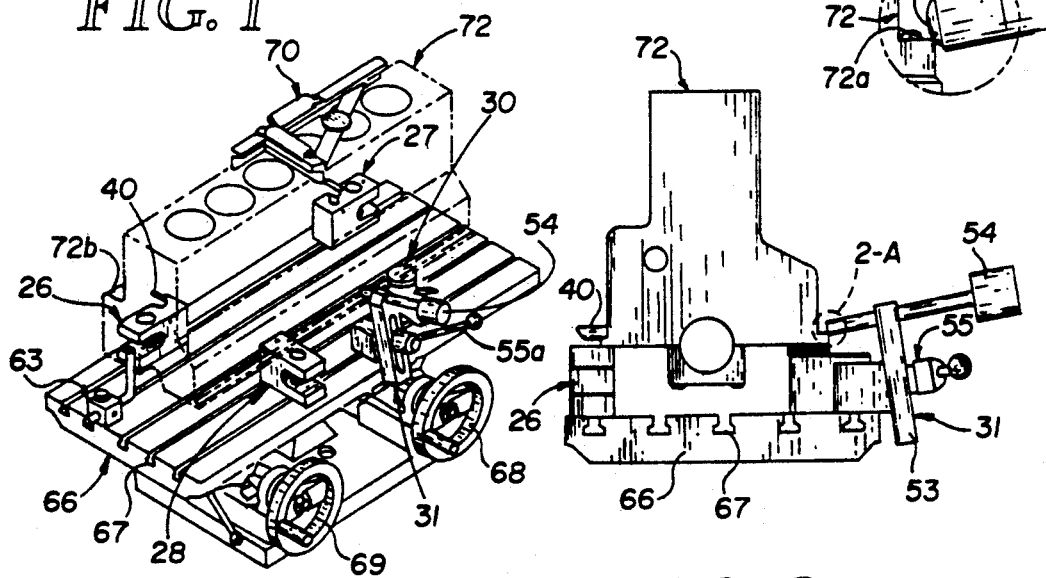
FIG. 1
FIG. 2

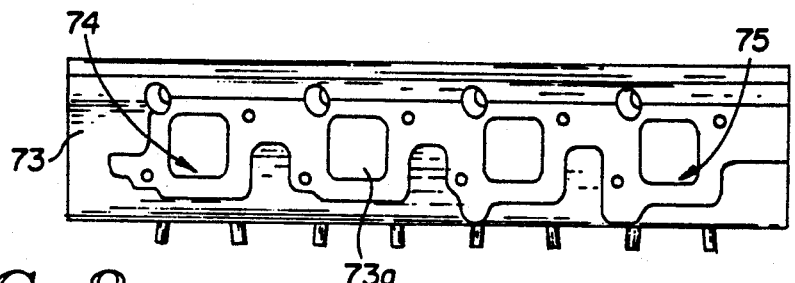
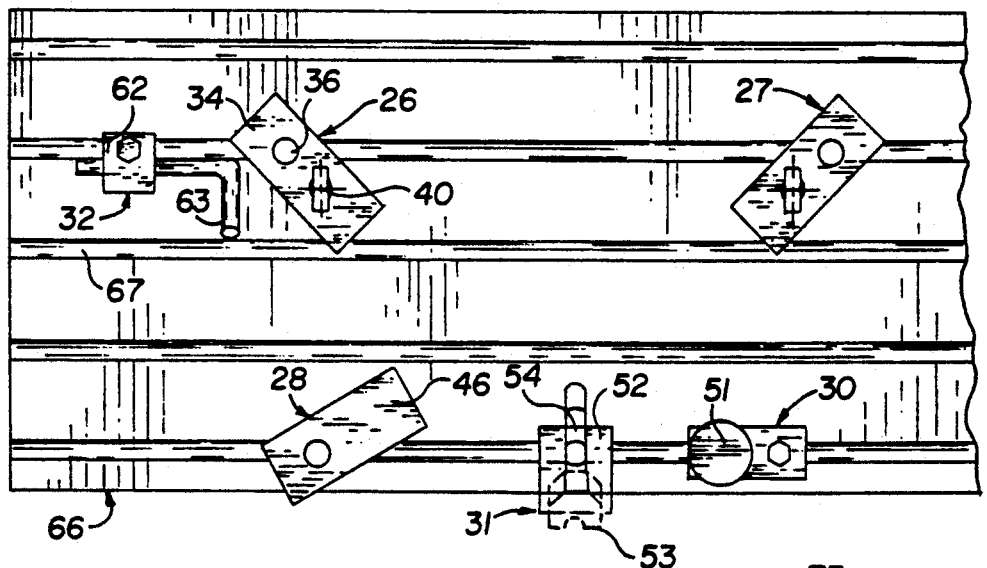
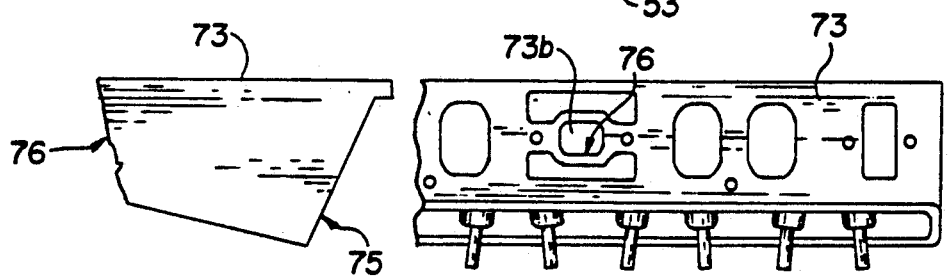

FIXTURE SYSTEM FOR MOUNTING WORK PIECES TO BE MACHINED

DESCRIPTION

1. Technical Field

The present invention relates to improved fixtures for mounting a work piece such as an engine head or block on an adjustable dual-axis table preliminary to resurfacing or other machining operations.

2. Background of the Invention

Engine heads or blocks have threaded manifold mounting holes on one side which traditionally have been utilized to receive studs to assist in anchoring them on the beds of resurfacing machines or other reconditioning equipment. It has become common to mount the work piece on an adjustable dual axis table which in turn is mounted on the machine bed. Such tables have T-ways by which fixtures can be anchored in various positions by anchoring bolts threaded in T-nuts fitting into the T-ways.

One type of fixture has comprised an elongated upright fixture presenting a series of slots and holes. The block to be worked on was lowered to a position in front of the fixture and maneuvered such as to find two slots or holes that would line up with the holes in the block so that anchoring bolts could be passed through the fixture into the block. Screwjack type fixtures were then adjusted to help support the head. This fixture system was not only time consuming to utilize, but is not readily adaptable for the great variety of sizes and shapes of blocks that presently exist.

An improved fixture system of this general type has been introduced having upwardly extending slots open at the top whereby studs can be prepositioned part way into the mounting holes of an engine head or block before it is maneuvered over the adjustable table on which the fixtures are mounted. The work piece can then be lowered so that the studs slide into the open upper ends of the fixture slots and seat at the bottom of the slots. Then the studs can be tightened to clamp the fixtures and work piece together. The fixtures can have a series of slots of differing depths for versatility as well as being adjustable along the T-ways. As before described, these fixtures are utilized in conjunction with jackscrew type fixtures for engaging the parts of the block on the opposite side thereof from the mounting bores.

However, the described improved fixturing system, although being easier to use and more versatile, did not provided an approach effective to adequately easily mount and firmly hold an ever increasing array of sizes and shapes of engine heads or blocks on the adjustable dual-axis table.

SUMMARY OF THE INVENTION

In accordance with the present invention a work piece such as an engine head or block to be resurfaced is positioned on two rear support blocks and on a front support block and screw jack which are all in turn adjustably mounted on an adjustable dual-axis table by mounting bolts screwed into T-heads slidably mounted in T-ways formed in the table. The two rear support blocks carry an adjustable vertical stem having an enlarged head with a bottom sloping face for engaging the block.

Forward of the work piece is another adjustable block clamped to the table which has a sloped face at the front sloping upwardly in the rear direction for engagement by an angularly adjustable bracket. This bracket engages the sloped face of the block and has an elongated slot receiving a locking bolt which has its rear end threaded into the block and has a lever handle at its forward end. The bracket also has a threaded hole spaced endwise of the elongated slot into which is screwed a sloping clamping element having a tapered head on its rear end and a handle at its front end. The tapered head is adjusted to press rearwardly and downwardly on a front portion of the work piece, and collectively with the heads on the rear mounting block stems, keeps the work piece from moving. An optional adjustable end stop is also provided.

BRIEF DESCRIPTION OF THE DRAWINGS

FIG. 1 is an isometric view showing the fixture system of the invention mounted in operative position holding an engine block on a dual-axis table;

FIG. 2 is an end view of the FIG. 1 installation;

FIG. 2A is an enlargement of the circled area 2-A in FIG. 2;

FIGS. 3 through 7 are exploded isometric views of the front clamping unit, end stop unit, one of the rear support units, front support unit, and front jack unit, respectively;

FIG. 8 is a top plan view of the fixture system positioned on a dual-axis table to receive a second example of an engine block; and FIGS. 9, 10 and 11 are rear, front, and end views of the engine block to be mounted by use of the FIG. 8 arrangement.

Detailed Description of the Invention

Figure 4:
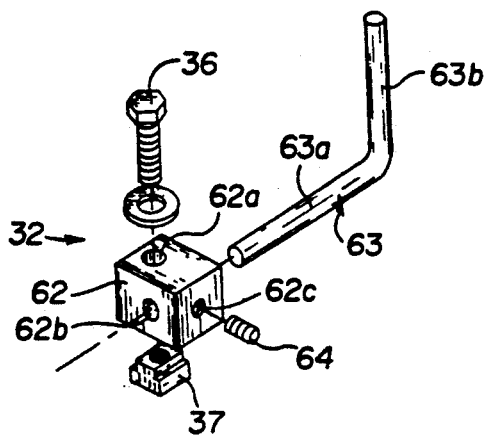
Figure 5:
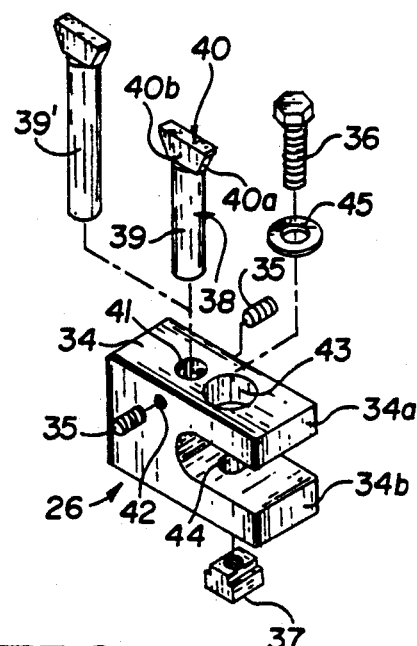
Figure 6:
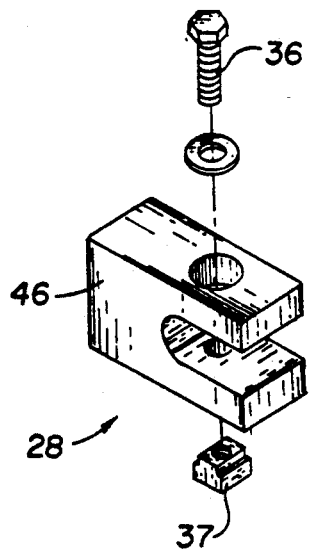
Figure 7:
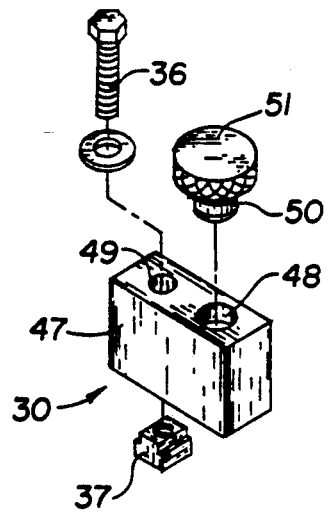

The fixture assembly of the present invention involves a pair of rear support units 26-27, a front support unit 28, a front jack unit 30, a front clamping unit 31, and an end stop unit 32.

Each rear support unit 26-27 comprises a support block 34, a pair of set screw 35, a clamping bolt 36 and complementing T-nut 37, and an upper work engaging element 38 having a round stem 39 with an enlarged hold-down head 40. The support block 34 presents a vertical bore 41 open at the top to receive the stem 39 of the work engaging element 38, and is intersected by two horizontal aligned threaded bores 42 receiving the set screws 35 for locking the stem 39 in selected orientation and depth in the bore 41. Forwardly of the bore 41 the support block 34 is preferably forked to provide upper and lower branches 34a, 34b formed with aligned upper and lower through-openings 43-44, the lower of which is threaded and receives the clamping bolt 36. The upper opening 43 is larger than the lower opening 44 for clearance in introducing the clamping bolt 36. The head of the clamping bolt 36 engages a washer 45 seated on the lower branch 34b.

The hold-down head 40 on the stem 39 has at least one tapered work engaging face 40a which flares upwardly away from the stem 39. The head 40 may be conical, but since it sometimes must be positioned in restricted openings in an engine block or other work piece, it is preferred to have the head 40 relatively narrow with a pair of flat side faces 40b extending between a pair of the tapered faces 40a as shown in the drawings.

The front support unit 28 has a support block 46 which may be like the rear support blocks 36, but without need for the bores 41-42, and is held in position in the same manner by a clamping bolt 36 and complementing T-nut 37. Continuing to the jack unit 30, this unit has a rectangular block 47 which is shorter than the support blocks 36 and 46, and has front and rear vertical bores 48-49. The rear bore 49 receives a clamping bolt 36 therethrough, and the front bore 48 is threaded to receive a jack screw 50 having an enlarged flat jacking head 51 with a knurled rim for ease in manual gripping to adjust the jack screw. When the jacking head is in its lowermost position its upper surface is at least as low as the level of the upper surfaces of the support blocks 36 and 46.

The front clamping unit 31 comprises a base block 52, bracket 53, clamping element 54, and locking unit 55. At its underside the base block 52 has an integral key 52a to fit into a T-way, and at its front the base block has a rearwardly sloped face 52b interrupted by a threaded bore 52c extending in perpendicular relation to the face 52b, i.e., sloping downwardly to the rear. The bracket 53 has a longitudinal slot 56 and a threaded bore 57 for respectively receiving the locking unit 55 and clamping unit 54.

The clamping unit 54 has an enlarged knurled head 54a for case in manual turning, and has a threaded stem 54b screwed through the bracket bore 57 and formed at its outer end with an axial bore to receive a pin extension 58a of a clamp nose piece 58 having a tapered nose 58b. The locking unit 55 has a lever handle 55a projecting laterally from a locking screw 55b passing through a washer 60 and the bracket slot 56 into the front sloped bore 52c in the base block 52. The base block is prevented from turning relative to a table on which it is seated by the key 52a, and is held seated by a clamping bolt 36 extending to a T-nut 37 through a vertical bore passing through the key 52a.

The end stop unit 32 has a square anchor block 62 also held in place by a clamping bolt 36 passing through a vertical bore 62a to a T-nut 37. This block 62 also has a side bore 62b intersected by a threaded front bore 62c for receiving an L-shaped stop rod 63 and a set screw 64, respectively. The stop rod 63 has an anchored leg 63a clamped by the set screw 64, and has its other leg 63b projecting in perpendicular relation to the anchored leg 63a to engage one end of the work piece.

The present invention is intended for use on an adjustable dual axis table 66 formed with several inverted T-ways 67 therealong extending from left to right for receiving T-nuts 37. Such a table can be tilted left and right by turning one control handle 68, and can be titled front and back by turning another control handle 69. It is preferred to use a dual axis level 70 in conjunction with the invention which can be placed on the top surface of the engine block to be resurfaced to determine which axis must be adjusted to achieve a horizontal top surface.

In using the present invention to position an engine block on a table for resurfacing by a cutterhead on a resurfacing machine, the blocks of the rear support units 26-27, front support unit 28 and front jack unit 30 are positioned to hold the pan rails of the engine block to be resurfaced approximately centered in the path of the cutterhead of the resurfacing machine. Generally it is preferred to place the front support unit 28 and jack unit 30 closer together than the spacing between the rear support units 26-27. It may be necessary to reposition the support units to clear parts of the engine block. During such repositioning the support blocks can be swung with respect to their clamping bolts 36 as well as being moved longitudinally along the table. Then the stems 39 are adjusted to adjust the height and orientation of the tapered heads 40 of the rear support units so that a tapered face 40a on each stem head 40 will hook over a portion of the adjacent side of the engine block or the bottom port of the rim of a port. This may involve some slight shifting of the engine block or use of a different length 39' of stem 39. The set screws 35 are then tightened to lock the tapered heads 40 in place, and the clamping bolts 36 are tightened. Then the screw jack 50 on the jacking unit 30 is adjusted by turning its head 51 to eliminate any rocking of the engine block.

Following the jack screw adjustment the front clamping unit 31 is adjusted so that the tapered surface of the nose 58b of the clamping element 54 engages the adjacent side of the block at a location such as a ledge or bottom outer edge portion of a port. This adjustment of the clamping element 54 is assisted by the fact that the position of the nose 58b can be elevated or turned by moving the bracket relative to the locking screw 55b with the handle 55a loosened, and the position of the entire clamping unit 31 can be adjusted longitudinally of the table by loosening the respective clamping bolt 36. After the nose 58b is positioned the handle 55a is lightly tightened. Then after the dual-axis table 66 has been adjusted so that the upper surface of the engine block is level the handle 55a is further tightened. During this further tightening the level resting on the top of the engine block is observed to detect any warping or shifting of the engine block. If the block moves or warps, slight repositioning of the front supports will generally solve the problem. When the engine block positioning operation is completed the engine block is prevented by the tapered head faces 40a on the rear support units 26-27 from moving rearwardly or upwardly at the rear, and is prevented from moving forwardly or upwardly at the front by the tapered nose 58b and slope of the locking screw 55b.

FIGS. 1 and 8 show the fixturing positions of the fixture units when holding two different types of engine blocks 72 and 73. In the FIG. 1 example the block 72 has front and back ledges 72a-72b therealong engaged, respectively, by the nose 58b (see FIG. 2-A) on the clamping screw 54, and by one of the tapered faces 40a on the stem head 40 of the rear support units 26-27 (see FIG. 2). In the FIG. 8 example the engine block 73 has four rear ports 73a and a central front port 73 b. In this situation the stem heads 40 of the rear support units 26-27 are positioned to engage the outer lower rim portions of the outer two ports 73a as indicated by the arrows 74-75 in FIG. 9, and the tapered head 58b of the front clamping unit 31 is positioned to engage the lower rim portion of the central front port 73b as indicated by the arrow 76 in FIG. 10.

Although not essential, it is preferred to use the end stop unit 32 as a stop at the end of the engine block from which the cutterhead of the resurfacing machine exits so as to assist in resisting endwise thrust exerted by the cutterhead. When so used, the anchor block 62 is positioned adjacent the appropriate end of the engine block and its clamping bolt 3 is tightened in the respective T-nut 37. The stop rod is then shifted so that its leg 63b engages the engine block, and then the set screw 64 is tightened.

From the foregoing it will be appreciated that, although specific embodiments of the invention have been described herein for purposes of illustration, various modifications may be made without deviating from the spirit and scope of the invention. Accordingly, the invention is not limited except as by the appended claims.

I claim:

1. A fixture system for mounting a work piece such as an engine head or block on a table having several laterally-spaced parallel T-ways therealong, said fixture system comprising:

two rear support blocks, a front support block, and a front leveling block for supporting a work piece;

an additional block between said front support block and leveling block;

each of said blocks having a depending anchoring bolt with a matching T-nut for fitting into a selected one of said T-ways;

a respective vertical stem mounted on each of said rear support blocks in horizontally offset relation to the respective anchoring bolt whereby the orientation of the stem relative to said table can be adjusted by turning the respective rear support block around the longitudinal axis of its anchoring bolt when the anchoring bolt is loosened;

each said stem having an enlarged head with a bottom face sloping upwardly and outwardly from the stem for seating on a rear portion of the work piece;

means for adjusting the height and orientation of each said head relative to the respective rear support block;

said leveling block having a vertical screw with a support head thereon;

said additional block having a front flat clamping face sloping upwardly in the rear direction and a threaded bore at right angles to said face;

an angularly adjustable bracket engaging said clamping face and having an elongated slot and a threaded hole therethrough which extends parallel to said threaded hole;

a locking bolt extending through said slot into said threaded bore in the additional block for securing said bracket against said clamping face in a selected position;

a threaded clamping element screwed through said threaded hole and having a rear head for engaging a front portion of the work piece, said clamping element in conjunction with said enlarged heads at the rear of the work piece being collectively operative to firmly hold said workpiece in a selected position on said table.

2. A fixture system according to claim 1 in which said head on said clamping element is tapered.

3. A fixture system according to claim 1 in which said locking bolt has a clamping handle thereon for manually turning the locking bolt and clamping said bracket firmly against said clamping face.

4. A fixture system according to claim 1 including an end block also having a depending anchoring bolt with a matching T-nut, said end block having a stop element for engaging an end of the work piece.

5. A fixture system comprising:

front and rear support means for supporting a work piece on a table;

vertically and angularly adjustable head elements mounted on said rear support means and having sloped bottom faces for engaging the rear of a work piece; and a front hold-down unit having a block with a front face sloping upwardly to the rear which is interrupted by a threaded bore, a bracket having an elongated slot and a threaded hole therethrough, hold-down means screwed through said threaded hole for engaging the front of the workpiece, and clamping means extending through said slot and screwed into said threaded bore for clamping said bracket against said front face of the block.

6. A fixture system according to claim 5 in which said block has a bottom horizontal key extending parallel to said front face and has a vertical bolt hole extending through said keyway for a hold-down bolt having a T-nut thereon.

7. A fixture system according to claim 5 in which one of said support means is adjustable in height.

8. A fixture system for supporting a work piece on a table having T-ways therealong, said system comprising:

front and rear support means for supporting a work piece on said table, one of said support means being adjustable in height;

adjustable head elements carried by said rear support means for engaging a rear portion of a work piece to prevent upward and rearward movement of the rear of the work piece; and a front adjustable unit having a base and a hold-down screw which is sloping downwardly to the rear for engaging a front portion of the workpiece, the mounting of said hold-down screw being such that it can be adjusted in height, rearward reach, and laterally relative to said base, said base and each of said support means having a depending anchor bolt with a T-nut for fitting into said T-ways.

9. A fixture system according to claim 8 in which said front adjustable unit includes a front sloped bracket through which said hold-down screw is screwed, said bracket being mounted on said base such that the bracket may be raised and swung laterally relative to said base, and means selectively clamping said bracket against said base.

* * * * *